United States Patent
Kim et al.

(10) Patent No.: US 9,801,122 B2
(45) Date of Patent: *Oct. 24, 2017

(54) ACCESS CONTROL METHOD AND APPARATUS OF UE

(71) Applicant: Samsung Electronics Co., Ltd., Suwon-si, Gyeonggi-do (KR)

(72) Inventors: Sangbum Kim, Seoul (KR); Soenghun Kim, Yongin-si (KR); Kyeongin Jeong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 73 days.

This patent is subject to a terminal disclaimer.

(21) Appl. No.: 14/882,171

(22) Filed: Oct. 13, 2015

(65) Prior Publication Data
US 2016/0037555 A1    Feb. 4, 2016

Related U.S. Application Data

(63) Continuation of application No. 13/461,970, filed on May 2, 2012, now Pat. No. 9,253,710.

(30) Foreign Application Priority Data

May 2, 2011 (KR) .................. 10-2011-0041562
Aug. 12, 2011 (KR) .................. 10-2011-0080685

(51) Int. Cl.
H04W 48/16  (2009.01)
H04W 48/06  (2009.01)
(Continued)

(52) U.S. Cl.
CPC .......... *H04W 48/16* (2013.01); *H04W 4/005* (2013.01); *H04W 48/06* (2013.01); *H04W 68/02* (2013.01);
(Continued)

(58) Field of Classification Search
CPC .. H04W 74/006; H04W 4/005; H04W 84/042
(Continued)

(56) References Cited

U.S. PATENT DOCUMENTS 7,483,702 B2   1/2009 Yeo et al.
8,001,388 B2   8/2011 Home et al.
(Continued)

FOREIGN PATENT DOCUMENTS

KR   10-2005-0079195 A    8/2005
KR      10-0765182 B1    10/2007

OTHER PUBLICATIONS

Nokia Corporation et al.; Solutions for MTC overload control for LTE; 3GPP TSG-RAN WG2 Meeting #71; R2-104720; XPO50451925; 3rd Generation Partnership Project (3GPP); Madrid, Spain; Aug. 17, 2010.

(Continued)

*Primary Examiner* — Hai V Nguyen
(74) *Attorney, Agent, or Firm* — Jefferson IP Law, LLP

(57) ABSTRACT

A method for controlling delay tolerant access of a Machine-Type Communication (MTC) device based on a backoff mechanism is provided. The method includes receiving, at a terminal, a paging message including an access barring information update indicator from a base station, and receiving a System Information Block (SIB) including updated access barring information, the SIB being received regardless of modification periods. The terminal receives the SIB including the updated access barring information immediately without waiting for the arrival of next modification period, resulting in improvement of access barring efficiency.

12 Claims, 12 Drawing Sheets

(51) Int. Cl.
*H04W 74/08* (2009.01)
*H04W 4/00* (2009.01)
*H04W 68/02* (2009.01)
*H04W 74/00* (2009.01)
*H04W 68/00* (2009.01)
*H04W 84/04* (2009.01)
*H04W 88/08* (2009.01)

(52) U.S. Cl.
CPC ..... *H04W 74/006* (2013.01); *H04W 74/0833* (2013.01); *H04W 68/00* (2013.01); *H04W 84/042* (2013.01); *H04W 88/08* (2013.01)

(58) Field of Classification Search
USPC ........................................ 455/515
See application file for complete search history.

(56) References Cited

U.S. PATENT DOCUMENTS

| | | | |
|---|---|---|---|
| 8,325,661 B2 | 12/2012 | Montojo et al. | |
| 8,352,747 B2 | 1/2013 | Horne et al. | |
| 8,457,618 B2 | 6/2013 | Narasimha et al. | |
| 8,457,629 B2 | 6/2013 | Chun et al. | |
| 8,478,286 B1* | 7/2013 | Fan | H04W 72/0446 455/410 |
| 8,542,707 B2* | 9/2013 | Hou | H04W 48/12 370/491 |
| 8,634,830 B2* | 1/2014 | Christensson | H04W 48/02 455/418 |
| 8,713,326 B2 | 4/2014 | Horne et al. | |
| 8,780,810 B2* | 7/2014 | Ryu | H04W 74/0833 370/328 |
| 8,787,232 B2* | 7/2014 | Ryu | H04W 48/02 370/311 |
| 8,817,755 B2* | 8/2014 | Wang | H04N 21/2365 370/336 |
| 8,837,443 B2* | 9/2014 | Yamada | H04L 47/12 370/230 |
| 8,868,743 B2* | 10/2014 | Park | H04W 4/00 709/223 |
| 8,937,907 B2* | 1/2015 | Ryu | H04W 52/0229 370/328 |
| 9,253,710 B2* | 2/2016 | Kim | H04W 48/06 |
| 9,307,447 B2* | 4/2016 | Widell | H04L 5/003 |
| 9,462,611 B2* | 10/2016 | Liu | H04W 48/06 |
| 9,609,584 B2* | 3/2017 | Kim | H04W 48/16 |
| 2006/0084443 A1 | 4/2006 | Yeo et al. | |
| 2007/0149206 A1* | 6/2007 | Wang | H04W 36/0077 455/450 |
| 2008/0043667 A1* | 2/2008 | Chun | H04W 48/02 370/328 |
| 2009/0104905 A1 | 4/2009 | DiGirolamo et al. | |
| 2009/0233634 A1* | 9/2009 | Aghili | H04W 76/007 455/466 |
| 2009/0318128 A1 | 12/2009 | Narasimha et al. | |
| 2010/0026472 A1* | 2/2010 | Kitazoe | G08B 27/006 340/311.2 |
| 2010/0035575 A1* | 2/2010 | Wu | H04W 4/22 455/404.1 |
| 2010/0054161 A1 | 3/2010 | Montojo et al. | |
| 2010/0075625 A1* | 3/2010 | Wu | H04W 4/22 455/404.1 |
| 2010/0075627 A1* | 3/2010 | Roberts | H04J 11/0093 455/404.1 |
| 2010/0290389 A1* | 11/2010 | Hou | H04W 48/12 370/328 |
| 2011/0170503 A1* | 7/2011 | Chun | H04W 74/006 370/329 |
| 2011/0199905 A1 | 8/2011 | Pinheiro et al. | |
| 2011/0270984 A1* | 11/2011 | Park | H04W 4/00 709/225 |
| 2011/0274040 A1 | 11/2011 | Pani et al. | |
| 2011/0294508 A1 | 12/2011 | Min et al. | |
| 2012/0039171 A1* | 2/2012 | Yamada | H04L 47/12 370/232 |
| 2012/0269122 A1* | 10/2012 | Lee | H04W 76/066 370/328 |
| 2013/0039309 A1 | 2/2013 | Chiu | |
| 2013/0040597 A1* | 2/2013 | Jang | H04W 48/02 455/404.1 |
| 2013/0040605 A1* | 2/2013 | Zhang | H04W 48/06 455/411 |
| 2013/0044702 A1* | 2/2013 | Jayaraman | H04W 48/06 370/329 |
| 2013/0051325 A1 | 2/2013 | Ryu et al. | |
| 2013/0083753 A1 | 4/2013 | Lee et al. | |
| 2013/0094462 A1 | 4/2013 | Montojo et al. | |
| 2013/0107778 A1 | 5/2013 | Ryu et al. | |
| 2013/0115913 A1 | 5/2013 | Lin et al. | |
| 2013/0121225 A1 | 5/2013 | Ryu | |
| 2013/0136072 A1 | 5/2013 | Bachmann et al. | |
| 2013/0188503 A1 | 7/2013 | Anepu et al. | |
| 2013/0301524 A1 | 11/2013 | Xu et al. | |
| 2013/0301525 A1 | 11/2013 | Xu et al. | |
| 2013/0301552 A1 | 11/2013 | Xu et al. | |
| 2014/0011505 A1 | 1/2014 | Liao | |
| 2014/0036669 A1* | 2/2014 | Yang | H04N 21/2365 370/230 |
| 2014/0080531 A1* | 3/2014 | Du | H04W 74/006 455/509 |
| 2014/0099912 A1* | 4/2014 | Lee | H04W 48/08 455/404.1 |
| 2014/0128029 A1 | 5/2014 | Fong et al. | |
| 2014/0348115 A1* | 11/2014 | Wang | H04N 21/2365 370/329 |
| 2014/0348116 A1* | 11/2014 | Yamada | H04L 47/12 370/329 |
| 2015/0079938 A1* | 3/2015 | Jung | H04W 48/06 455/411 |
| 2015/0237566 A1* | 8/2015 | Lee | H04W 48/06 370/230 |
| 2016/0037446 A1* | 2/2016 | Kim | H04W 48/06 455/515 |
| 2016/0037554 A1* | 2/2016 | Kim | H04W 48/06 370/336 |
| 2016/0037556 A1* | 2/2016 | Kim | H04W 48/06 370/336 |
| 2016/0302135 A1* | 10/2016 | Yang | H04N 21/2365 |

OTHER PUBLICATIONS

Lien et al.; Toward Ubiquitous Massive Accesses in 3GPP Machine-to-Machine Comunications; Recent Progress in Machine-to-Machine Communications; vol. 49, No. 4; IEEE Communications Magazine; Piscataway, US; Apr. 1, 2011.

ZTE; Way forward for RAN overload solutions; 3GPP TSG-RAN WG2 meeting #73bis; R2-112017; XP050494512; Shanghai, China; Apr. 5, 2011.

Huawei et al.; Further consideration on EAB; 3GPP TSG-RAN WG2 Meeting #74; R2-112951; XP050494960; Barcelona, Spain; May 1, 2011.

Samsung; Gverview of solutions on MTC; 3GPP TSG RAN WG2#74; R2-113261; XP050495413, 3rd Generation Partnership Project (3GPP); Barcelona, Spain; May 3, 2011.

* cited by examiner

FIG. 12

| 1205 | 0 | 1 | Category a |
| 1210 | 1 | 0 | Category b |
| 1215 | 1 | 1 | Category c |

ACCESS CONTROL METHOD AND APPARATUS OF UE

PRIORITY

This application is a continuation application of prior application Ser. No. 13/461,970, filed on May 2, 2012, which claimed the benefit under 35 U.S.C. §119(a) of a Korean patent application filed on May 2, 2011 in the Korean Intellectual Property Office and assigned Serial No. 10-2011-0041562, and a Korean patent application filed on Aug. 12, 2011 in the Korean Intellectual Property Office and assigned Serial No. 10-2011-0080685, the entire disclosure of each of which is hereby incorporated by reference.

BACKGROUND OF THE INVENTION

1. Field of the Invention

The present invention relates to a method for controlling a delay tolerant access of a Machine-Type Communication (MTC) device in a 3rd Generation Partnership Project (3GPP) system. More particularly, the present invention relates to a backoff method for reducing wireless network overload caused by simultaneous attempts of a plurality of MTC devices within a cell.

2. Description of the Related Art

Mobile communication systems have been developed to provide subscribers with voice communication services on the move. With the advancement of technology, the mobile communication systems have been evolved to support high speed data communication services as well as standard voice communication services. Recently, a next generation mobile communication system shifts its paradigm from Human to Human (H2H) to Machine to Machine (M2M). In order to meet this paradigm shift, the 3GPP has standardized the MTC.

The MTC has unique features as compared to normal wireless communication. The features are variously categorized according to a purpose of the MTC. For example, some MTC devices require only a few communication sessions per data regardless of time, and thus communication time has a delay-tolerant feature. Other MTC devices, installed at a fixed place to collect and transmit information without mobility, have a low mobility feature. A mobile carrier has to provide service in consideration of a coexistence between both the MTC device as well as a legacy User Equipment (UE).

A plurality of MTC devices may operate in one cell. Accordingly, when multiple MTC devices attempt to simultaneously access a network, the access may instantly cause an abrupt increase of a radio network load. Such an abrupt increase makes the radio network instable which results in an initial attachment failure of most MTC devices. Since most of the MTC devices are characterized by the delay-tolerant feature, it is not inevitable to establish a connection with a base station (evolved Node B or eNB) immediately. If the network load exceeds a preset threshold, the eNB restricts the MTC devices' initial access to the network first in order to control the overload. Recently, a method for extending an access barring mechanism has been introduced to control the network load. A normal access barring mechanism operates by transmitting related information in a System Information Block (SIB).

However, it takes a relatively long time for the eNB to acquire the SIB after its modification in structure. Accordingly, it is not efficient to adopt the normal access barring mechanism, without modification, to the wireless network in which traffic load increases abruptly.

Therefore, a need exists for a system and method for reducing a network load.

SUMMARY OF THE INVENTION

Aspects of the present invention are to address at least the above-mentioned problems and/or disadvantages and to provide at least the advantages described below. Accordingly, an aspect of the present invention is to provide a random access method that is capable of efficiently reducing a load of a Radio Access Network (RAN).

In accordance with an aspect of the present invention, a random access execution method of a terminal is provided. The method includes receiving a paging message including an access barring information update indicator from a base station, and receiving a System Information Block (SIB) including updated access barring information, the SIB being received regardless of modification periods.

In accordance with another aspect of the present invention, a random access execution method of a base station is provided. The method includes transmitting a paging message including an access barring information update indicator to a terminal, and transmitting a SIB including updated access barring information, the SIB being received by the terminal regardless of modification periods.

In accordance with another aspect of the present invention, a terminal for executing random access is provided. The terminal includes a transceiver for transmitting and receiving signals to and from a base station, and a controller for controlling to receive a paging message including an access barring information update indicator from a base station and a SIB including updated access barring information, the SIB being received regardless of modification periods.

In accordance with still another aspect of the present invention, a base station for executing random access is provided. The base station includes a transceiver for transmitting and receiving signals to and from a terminal, and a controller for controlling to transmit a paging message including an access barring information update indicator to a terminal and a SIB including updated access barring information, the SIB being received by the terminal regardless of modification periods.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIG. 12 is a diagram illustrating formats of an Extended Access Barring (EAB) category indicator for use in an access control method according to an exemplary embodiment of the present invention.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention provide a method for efficiently controlling Machine-Type Communication (MTC) devices attempting a delay tolerant access in a 3rd Generation Partnership Project (3GPP) system.

The exemplary embodiments of the present invention also provide a method for restricting simultaneous access of the MTC devices attempting access to the network in order to prevent an overload.

A Release 11 (Rel-11) MTC issue has been discussed, which is focused on a Radio Access Network (RAN) overload. As one approach for addressing the RAN overload, an Extended Access Barring (EAB) has been introduced. In the EAB, a new Access Class (AC) is provided for a delay tolerant access, i.e., MTC device, and thus all types of MTC devices may be categorized into the AC. In order to efficiently control initial access of the MTC devices belonging to the AC, AC information is included in a System Information Block (SIB). Even in a case of not defining the new AC, it is defined for the MTC devices to receive the AC information. Typically, the AC information is included in a second SIB (SIB2). The EAB introduced in the Rel-11 may be included in the SIB2 or a newly defined SIB. In an exemplary embodiment of the present invention, the SIB including the EAB information is referred to as a SIBx.

The use of the normal SIB transmission mechanism for transmitting the EAB-related information in the SIBx has a problem in that it is difficult to apply the AC immediately when the RAN overload is detected.

Figure 1:
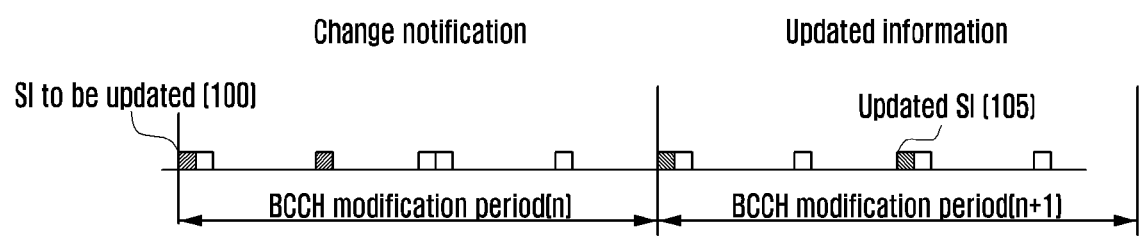
FIG. 1 is a diagram illustrating a normal System Information Block (SIB) transmission mechanism according to an exemplary embodiment of the present invention.

FIG. 1 is a diagram illustrating a normal SIB transmission mechanism according to an exemplary embodiment of the present invention.

Referring to FIG. 1, in a normal SIB transmission method, a modification period concept is used. That is, the system notifies of an update of System Information (SI) 100 using a paging message for the modification period. If a SystemInfoModification Information Element (IE) is included in the paging message, the updated SI 105 is transmitted in a next modification period. Although only one of several SI messages is changed, this is indicated by the paging message. Exceptionally, if a SIB10 and SIB11 includes an Earthquake and Tsunami Warning System (ETWS), the SI can be updated regardless of the boundary of the modification period. If the paging message indicates the ETWS along with an ETWS-Indication IE, an evolved Node B (eNB) attempts to receive the SIB10 and SIB11 immediately. The length of a modification period is notified by SIB2 and has a maximum value of 10.24 seconds. In a case of using a basic SIB transmission method without modification, the eNB has to wait for the arrival of the next modification period after verifying the SI update in the paging message such that the initial access attempts of the MTC devices continue until a new EAB is applied.

Figure 2:
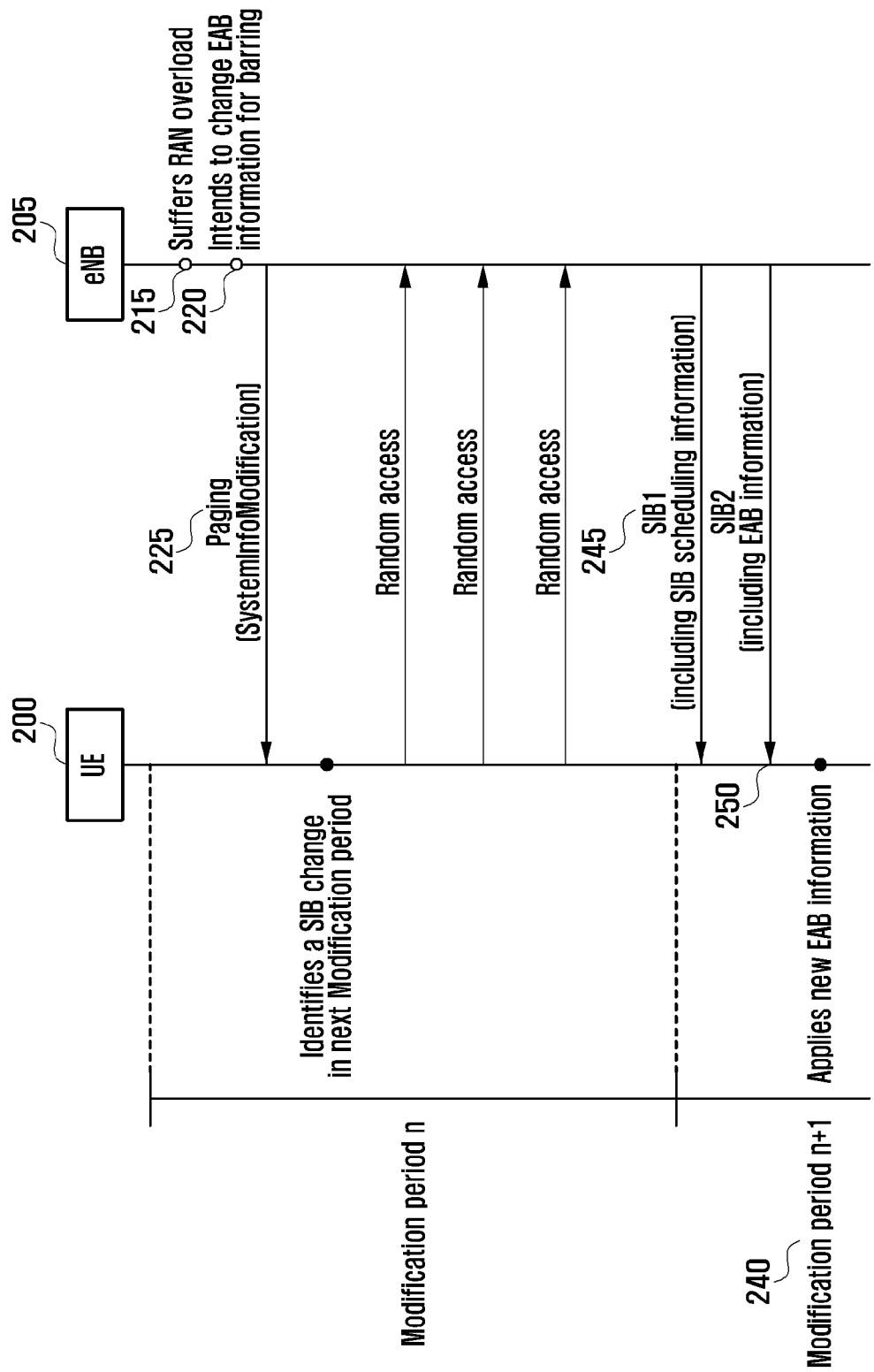
FIG. 2 is a signaling diagram illustrating a method for addressing a problematic situation in a normal SIB transmission mechanism according to an exemplary embodiment of the present invention.

FIG. 2 is a signaling diagram illustrating a method for addressing a problematic situation in a normal SIB transmission mechanism according to an exemplary embodiment of the present invention.

Referring to FIG. 2, an eNB 205 detects an abrupt overload of network traffic at step 215 and thus restricts initial access attempts of the MTC devices at step 220 to control the network overload. For this purpose, the eNB 205 transmits to a UE 200 a SystemInfoModification IE in a paging message at step 225. Upon receipt of the paging message, the UE 200 verifies the modification of the SIB in a next modification period. However, since the SIB has not been received, the UE 200 continues the initial access attempt based on basic information. Accordingly, the network overload is not alleviated until the next modification period 240 arrives. If the next modification period 240 arrives, the UE attempts decoding on a SIB1 at step 245 because the SIB1 contains scheduling information on another SIB. The UE 200 then receives a SIBx including the EAB information at step 250. The eNB 200 may acquire modified EAB information from the SIBx at step 225. In an exemplary embodiment of the present invention, a fast AC information acquisition method that is capable of minimizing the AC information acquisition delay is provided.

First Exemplary Embodiment

In a first exemplary embodiment of the present invention, the EAB information change, such as the ETWS, is indicated in the paging message. If a paging message including an indicator indicating the EAB information change is received, the delay tolerant MTC device may stop the use of the old EAB information and wait for acquiring new EAB information. The MTC device may receive the SIBx scheduling information including the EAB information from the SIB1 immediately without waiting for the arrival of the next modification period to acquire the EAB-related information from the SIBx.

If the UE is not a MTC device but a normal device, the UE ignores the paging message including the indicator related EAB information. The SIBx means a SIB including the EAB information. The MTC device determines whether an access is permitted using the AC-related information. If the EAB information indicates an access is not permitted for the MTC device, the MTC device delays the attempt to access. Then, the MTC device would attempt an access again according to established methods. For example the MTC device may determine a backoff time and a delay random access transmission. Alternatively, the MTC device could delay the access attempt until receives new EAB information lifted ban on access. If the EAB-related information has changed, the network informs of the change in the SIB information.

When the SI change information is received, the UE performs a normal initial access procedure. That is, only when the EAB change information is received, the MTC device takes a newly defined action. The first exemplary embodiment of the present invention is implemented such that the UE receives the SIB in the paging message regardless of the modification period like the ETWS. However, the first exemplary embodiment of the present invention has features different from the ETWS.

The main difference is that the first exemplary embodiment of the present invention is applied to only MTC devices while the ETWS is applied to normal devices. That is, although the paging message including the EAB indicator according to the first exemplary embodiment of the present invention is received by a normal device, the device ignores the SIB and thus the device does not progress to a next step.

Another difference is that the UE receiving the paging message including the ETWS indicator instructs a display of disaster information while the EAB indicator according to the first exemplary embodiment of the present invention instructs the UE to delay the random access transmission.

Figure 3:
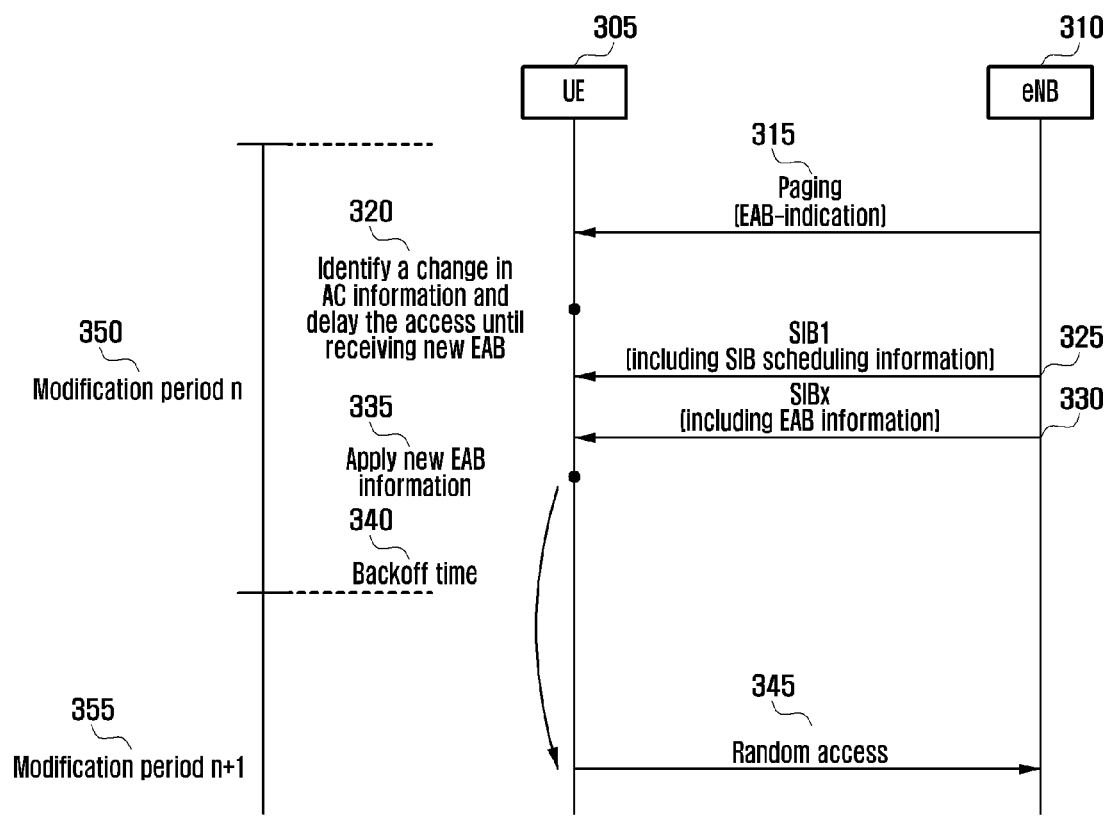
FIG. 3 is a signaling diagram illustrating an access control method according to a first exemplary embodiment of the present invention.

FIG. 3 is a signaling diagram illustrating an access control method according to the first exemplary embodiment of the present invention.

Referring to FIG. 3, if it is determined to control an initial connection of a MTC device (i.e., a UE equipped with Machine Type Communication) 305 due to a RAN overload, the eNB 310 transmits the UE 305 a paging message including an EAB-indication IE at step 315. The EAB-indication IE is used for informing of the change of the EAB-related information. If the EAB-indication is received, the UE 305 delays the access attempt until new EAB information is acquired at step 320.

In order to acquire the new EAB information, the UE 305 first receives SIB1 information from the eNB 310 at step 325. The SIB1 information includes SIB scheduling information. By referencing the scheduling information, the UE 305 receives a SIBx including the EAB information at step 330. The UE 305 applies the acquired EAB information at step 335 and determines whether an access is allowed. Then, the UE 305 would attempt an access again according to established methods. For example, the EAB information could include an information needed for the calculation a backoff time 340, as well as an information whether to allow an access. The UE 305 calculates a backoff time using the EAB information in order to delay the access attempt during the backoff time 340. After the backoff time has elapsed, the UE 305 attempts an initial access at step 345. Alternatively, the UE 305 could delay the access attempt until receives new EAB information lifted ban on access. In an exemplary implementation, modification periods 350 and 355 are ignored.

Figure 4:
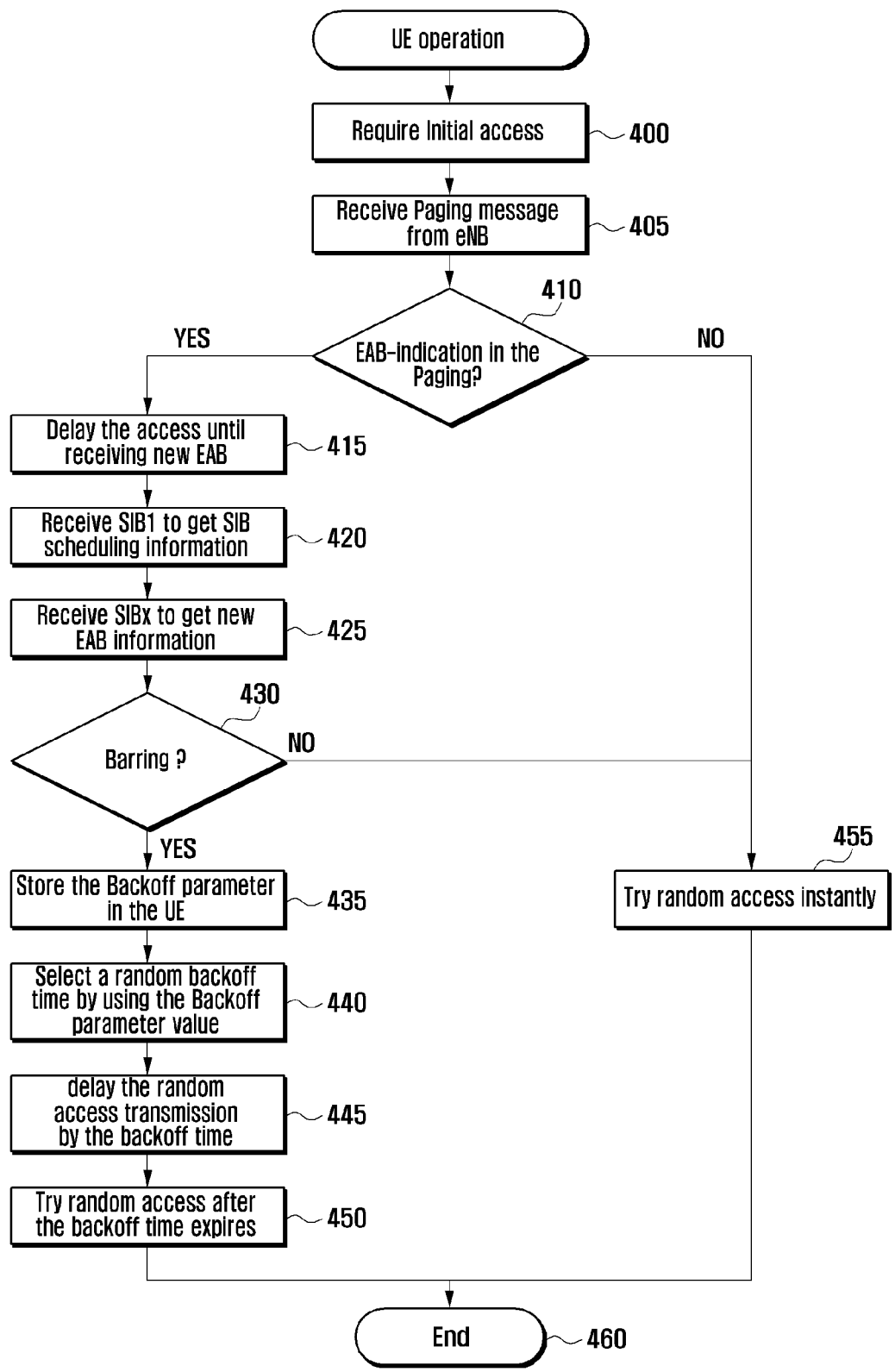
FIG. 4 is a flowchart illustrating a User Equipment (UE) procedure of an access control method according to the first exemplary embodiment of the present invention.

FIG. 4 is a flowchart illustrating a UE procedure of an access control method according to the first exemplary embodiment of the present invention.

Referring to FIG. 4, the UE is required to perform initial access to an eNB at step 400. The UE receives a paging message at step 405. Upon receipt of the paging message, the UE determines whether the paging message includes an EAB-indication IE at step 410. If the EAB-indication is not included, the UE attempts random access instantly at step 455. The UE determines whether the access is attempted for delay tolerant access as a MTC device at step 413. Because the EAB information is adapted to delay tolerant access of the MTC devise, if the UE is not a MTC device, the UE attempts an access instantly at step 455. Otherwise, the UE delays the random access until the changed EAB information is acquired at step 415. The UE receives a SIB1 to acquire SIB scheduling information at step 420. The UE then receives a SIBx to acquire the changed EAB information at step 425. The UE determines whether it is barred at step 430. If it is determined that the UE is not barred at step 430, the UE attempts random access at step 455. Otherwise, if it is determined that the UE is barred at step 430, the UE extracts a backoff parameter necessary for determining a backoff time and saves the backoff parameter at step 435. The UE then determines the backoff time to be actually applied using the backoff parameter at step 440. Next, the UE delays the random access during the determined backoff time at step 445. After the backoff time expires, the UE attempts random access at step 450. The procedure ends at step 460.

Second Exemplary Embodiment

In a second exemplary embodiment of the present invention, if the EAB-indication is received in the paging message, the UE delays random access until the arrival of a next modification period. If the random access is required, a delay tolerant MTC device waits for the next modification period and attempts random access by instantly applying the new EAB information received in the next modification period rather than the current access information. That is, if an event triggering an initial random access takes place, the UE waits for the next modification period to refresh the EAB information and attempts the initial random access.

Figure 5:
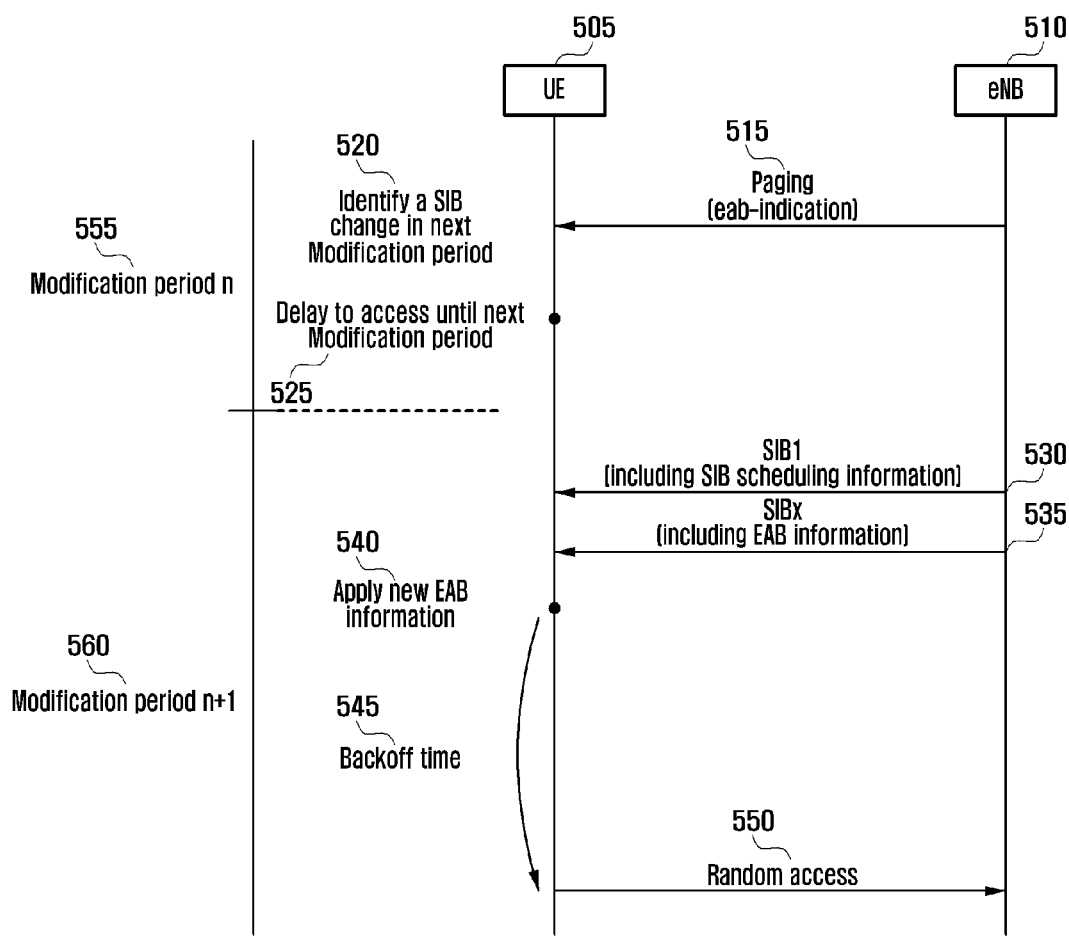
FIG. 5 is a signaling diagram illustrating an access control method according to a second exemplary embodiment of the present invention.

FIG. 5 is a signaling diagram illustrating an access control method according to the second exemplary embodiment of the present invention.

Referring to FIG. 5, if it is determined to control an initial random access of a MTC device (UE) 505 due to a network overload, the eNB transmits a paging message including an EAB-indication IE to the UE 505 at step 515. The EAB-indication IE is used for informing of the change of the EAB-related information. If the EAB-indication is received, the UE 505 predicts receipt of new EAB information in a next modification period 560 at step 520. The UE 505 delays random access until the new EAB information in a next modification period 560 at step 525. If the old modification period 555 has passed and the new modification period 560 arrives, the UE 505 receives a SIB1 from the eNB 510 to acquire the new EAB information at step 530. The SIB1 includes SIB scheduling information. By referencing the SIB1, the UE 505 receives a SIBx including EAB information at step 535. The UE 505 applies the newly acquired EAB information at step 540 and determines a backoff time 545 based on the EAB information to delay the random access during the backoff time 545. After the backoff time has elapsed, the UE 505 attempts an initial random access at step 550.

Figure 6:
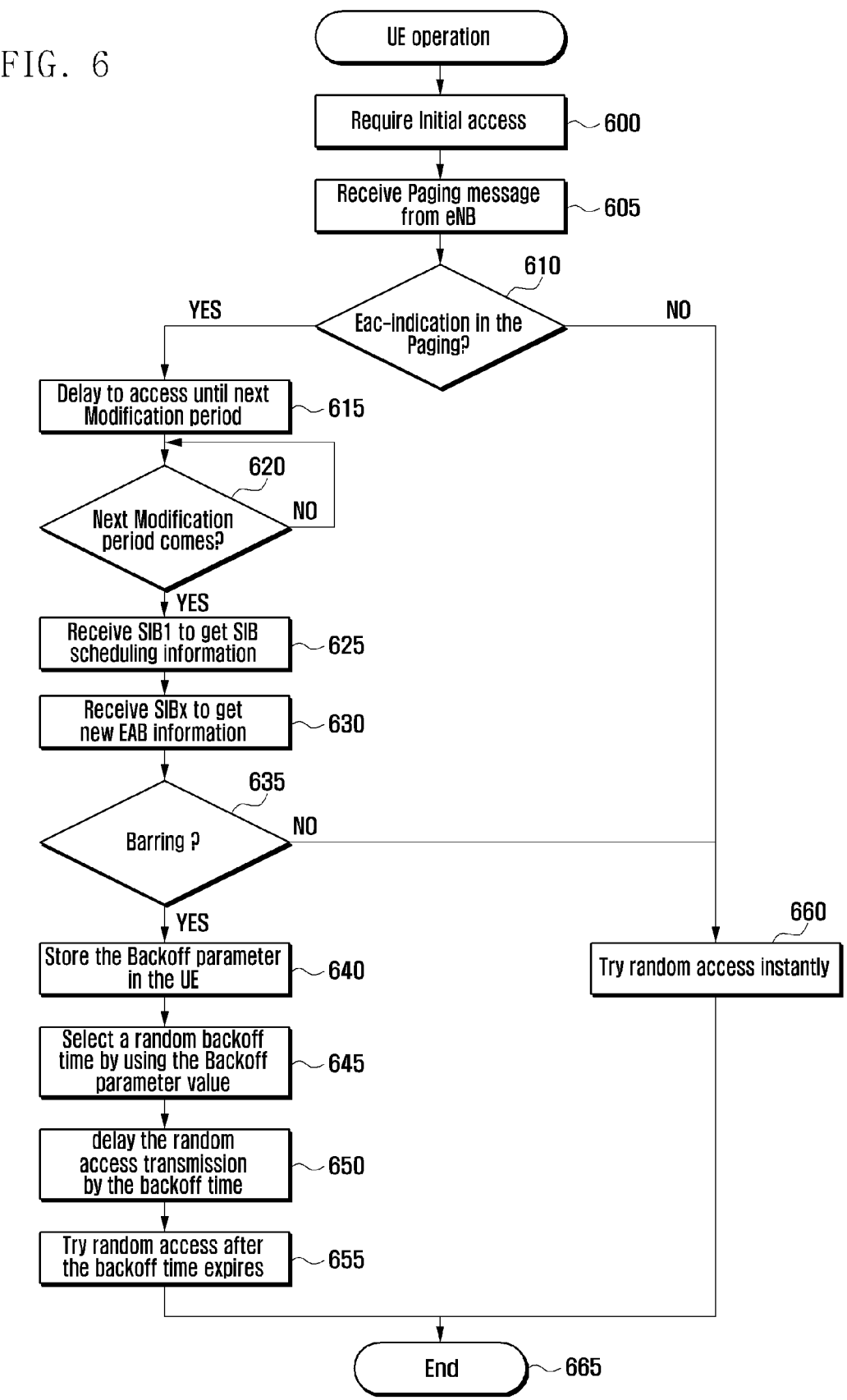
FIG. 6 is a flowchart illustrating a UE procedure of an access control method according to the second exemplary embodiment of the present invention.

FIG. 6 is a flowchart illustrating a UE procedure of an access control method according to the second exemplary embodiment of the present invention.

Referring to FIG. 6, the UE is triggered to perform an initial random access to an eNB at step 600. Thereafter, the UE receives a paging message at step 605. Upon receipt of the paging message, the UE determines whether the paging message includes an EAB-indication IE at step 610. If it is determined that the EAB-indication is not included, the UE instantly attempts a random access at step 660. If it is determined that the EAB-indication is included, the EAB information has changed. Accordingly, the UE delays the random access until new EAB information is received in a next modification period at step 615. The UE determines whether the next modification period has arrived at step 620. If it is determined that the next modification period has arrived, the eNB transmits new EAB information and thus the UE receives a SIB1 including SIB scheduling information at step 625. The UE then receives a SIBx to acquire the updated EAB information at step 630. The UE determines whether it is barred from accessing the eNB at step 635. If it is determined that the UE is not barred, the UE attempts the random access at step 660. Otherwise, if it is determined that the UE is barred, the UE extracts a backoff parameter necessary for determining a backoff time from the EAB information and saves the backoff parameter at step 640. The UE determines the backoff time to be applied based on the backoff parameter at step 645. The UE delays the random access during the determined backoff time at step 650. If the backoff time expires, the UE attempts the random access at step 655. The procedure ends at step 665.

Third Exemplary Embodiment

In a third exemplary embodiment of the present invention, the EAB information change is not explicitly notified, and the modification period is not used. However, the SIBx including the EAB information is transmitted periodically unlike other SIBs. In an exemplary implementation, the modification period is referred to as a repetition period. If it is necessary for the UE to perform the random access, the random access is delayed until the SIB1 is received. The SIB1 may include the scheduling information on the SIBx.

If the SIB1 does not include the SIBx scheduling information, the UE may immediately attempt the random access. If the SIB1 includes the SIBx scheduling information, the UE attempts the random access using the EAB information updated based on the SIBx received by referencing the scheduling information. As a result, there is a drawback in that all of the UEs simultaneously attempt access at the SIB1 reception timing when the access barring is not executed. That is, the method according to the third exemplary embodiment of the present invention may cause a wireless network overload at the SIB transmission timing Therefore, there is a need for overcoming the drawback of the UE simultaneously attempting to access at the SIB1. One approach is to control such that the random access is mandatorily attempted after a backoff time even when the random access of the MTC device is not barred. Since the MTC device has the delay tolerant feature, the data transmission delay causes no significant problems. In order to determine the backoff time to be applied for the initial access, the backoff-related information may be included in the SIBx. As a result, access of the MTC devices are distributed such that the network load is balanced.

Figure 7:
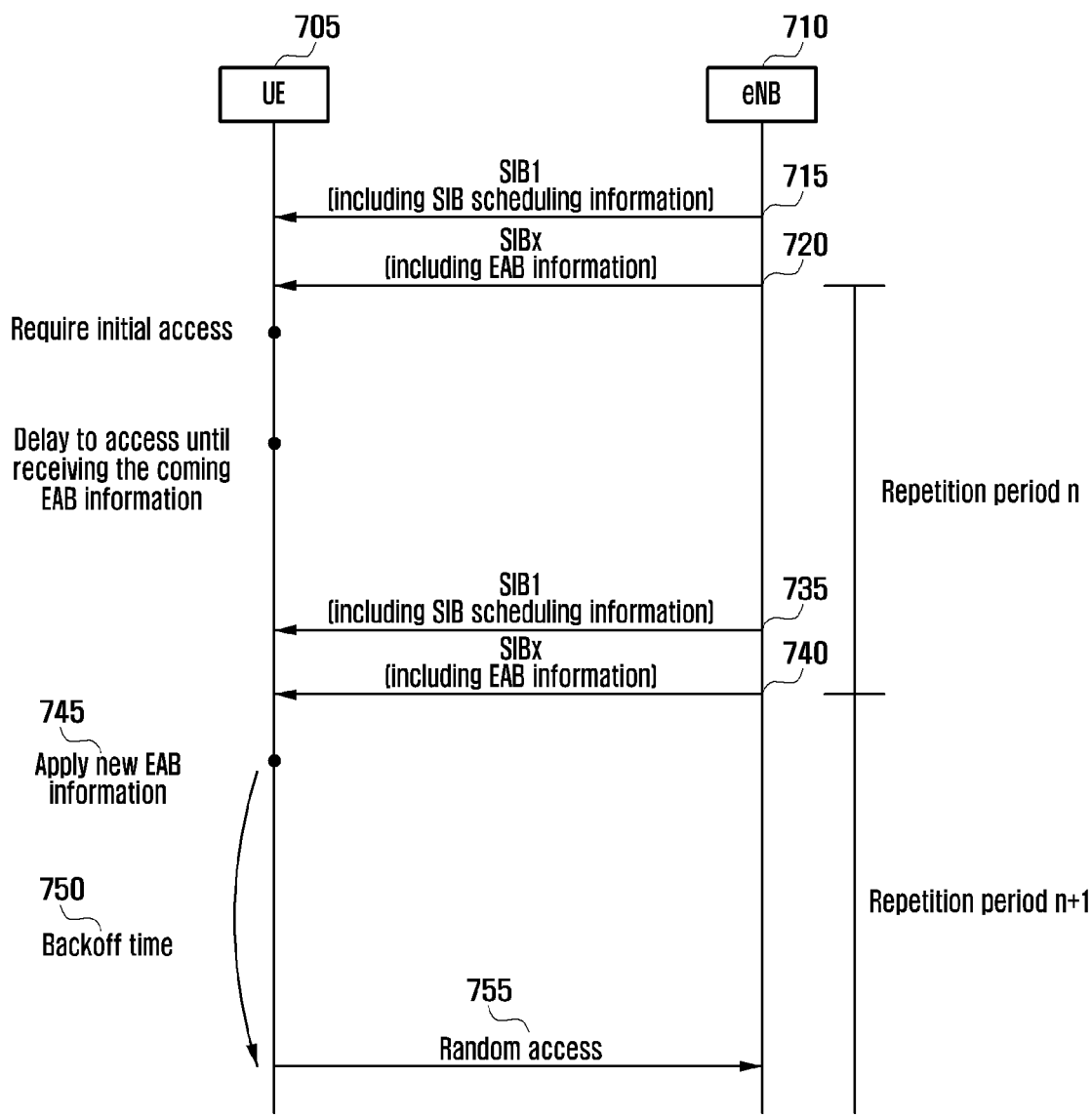
FIG. 7 is a signaling diagram illustrating an access control method according to a third exemplary embodiment of the present invention.

FIG. 7 is a signaling diagram illustrating an access control method according to the third exemplary embodiment of the present invention.

Referring to FIG. 7, an eNB 710 periodically transmits a SIBx 720 based on a repetition period 760. The repetition period is notified to the UE 705 through the SIB1 715 and 735. If it is determined that an initial random access is necessary, the UE 705 delays the initial random access to the next SIB1 reception timing 735. That is, if the SIB1 does not include scheduling information on the SIBx, the UE may immediately try the initial access. In this case, a plurality of UEs attempt access to the eNB to instantly increase the RAN load. In order to distribute the load, a short backoff operation may mandatorily be performed. The UE 705 receives the SIBx at step 740 and applies the updated EAB information acquired from the SIBx at step 745. The UE 705 delays the access attempt during the backoff time 750 based on the EAB information. Finally, the UE 705 attempts the access at a time when the backoff time expires at step 755.

Figure 8:
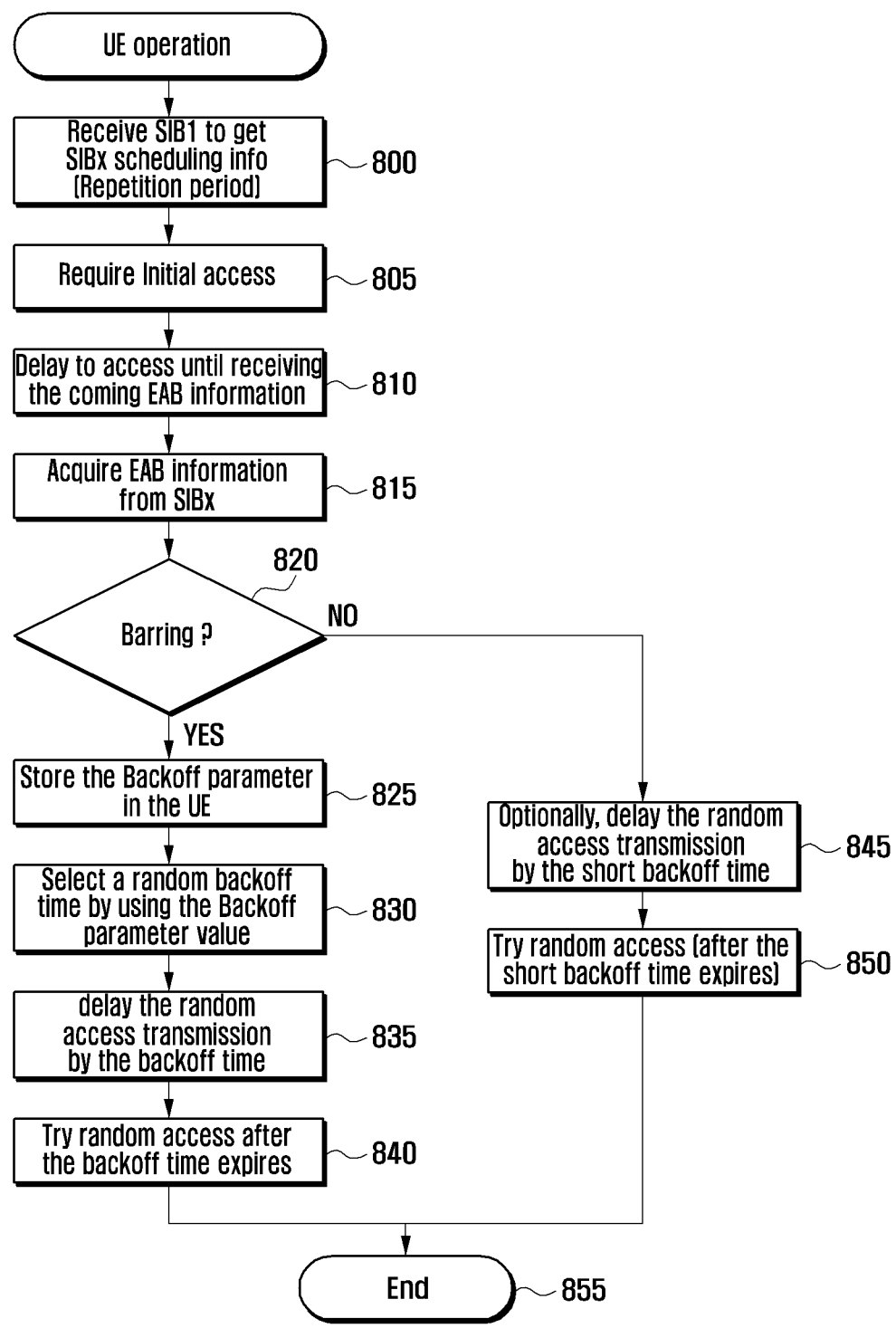
FIG. 8 is a flowchart illustrating a UE procedure of an access control method according to the third exemplary embodiment of the present invention.

FIG. 8 is a flowchart illustrating a UE procedure of an access control method according to the third exemplary embodiment of the present invention.

Referring to FIG. 8, the UE receives information, i.e., period information, necessary for acquiring a SIBx from a SIB2 at step 800. The UE then determines whether to perform an initial access to the eNB at step 805. At this time, the UE delays the initial access attempt until changed EAB information is acquired from the SIBx at step 810. The UE acquires the EAB information from the SIBx at step 815. The UE determines whether it is barred from accessing the eNB based on the EAB information at step 820. If it is determined that the UE is not barred from accessing the eNB, the UE attempts access to the eNB at step 850. In order to distribute a load to overcome the aforementioned drawback, the access may be delayed during a relatively short backoff time at step 845. The information for determining the backoff time may be provided in the SIBx. If it is determined that the UE is barred from accessing the eNB, the UE saves the backoff parameter necessary for determining the backoff time from the EAB information at step 825. The UE determines the backoff time to be applied based on the backoff parameter at step 830. The UE then delays the access until the backoff time expires at step 835. If the backoff time has expired, the UE attempts access to the eNB at step 840. The procedure ends at step 855.

Fourth Exemplary Embodiment

In a fourth exemplary embodiment of the present invention, the EAB information is included in a paging message.

The EAB information does not need a large amount of information. It is enough to secure the amount for including the information indicating access barring of the MTC device and backoff parameter necessary for determining the backoff time. Accordingly, it is not so burdensome to insert corresponding information into the paging message. If the paging message includes a barring indication, the MTC device backs off based on the EAB information for initial access.

Figure 9:
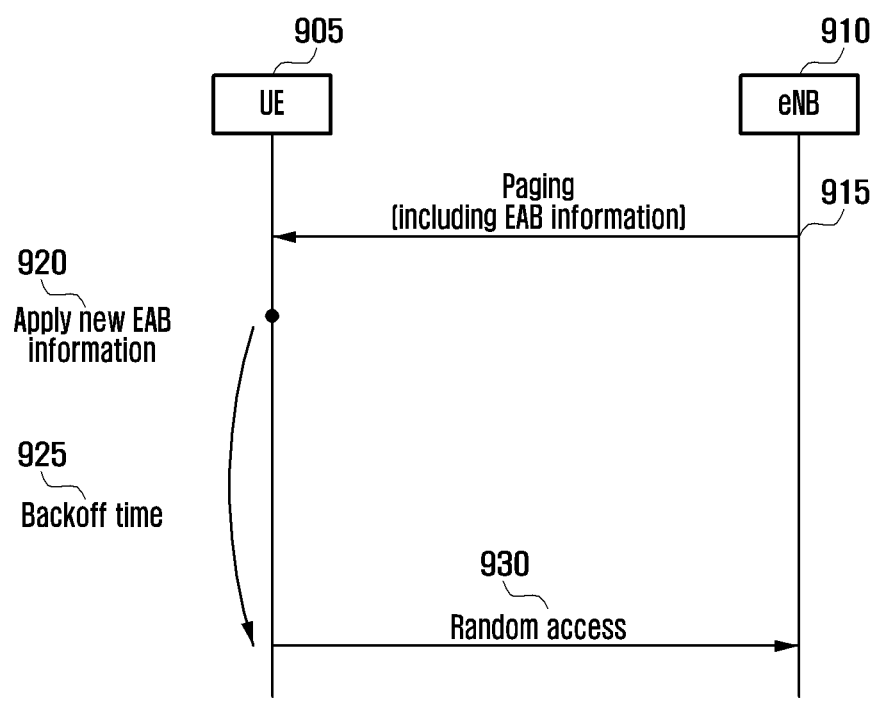
FIG. 9 is a signaling diagram illustrating an access control method according to a fourth exemplary embodiment of the present invention.

FIG. 9 is a signaling diagram illustrating an access control method according to the fourth exemplary embodiment of the present invention.

Referring to FIG. 9, if it is determined to control an initial connection of a MTC device (UE) 905 due to the RAN overload, the eNB 910 transmits to the UE 905 a paging message including the EAB information at step 915. Upon receipt of the EAB information, the UE 905 applies the new EAB information for a preset time duration at step 920. If the initial access is triggered in a preset time, the UE determines the backoff time 925 based on the EAB information and delays an access attempt for the backoff time 925. If the backoff time expires, the UE attempts a random access to the eNB 910 at step 930.

Figure 10:
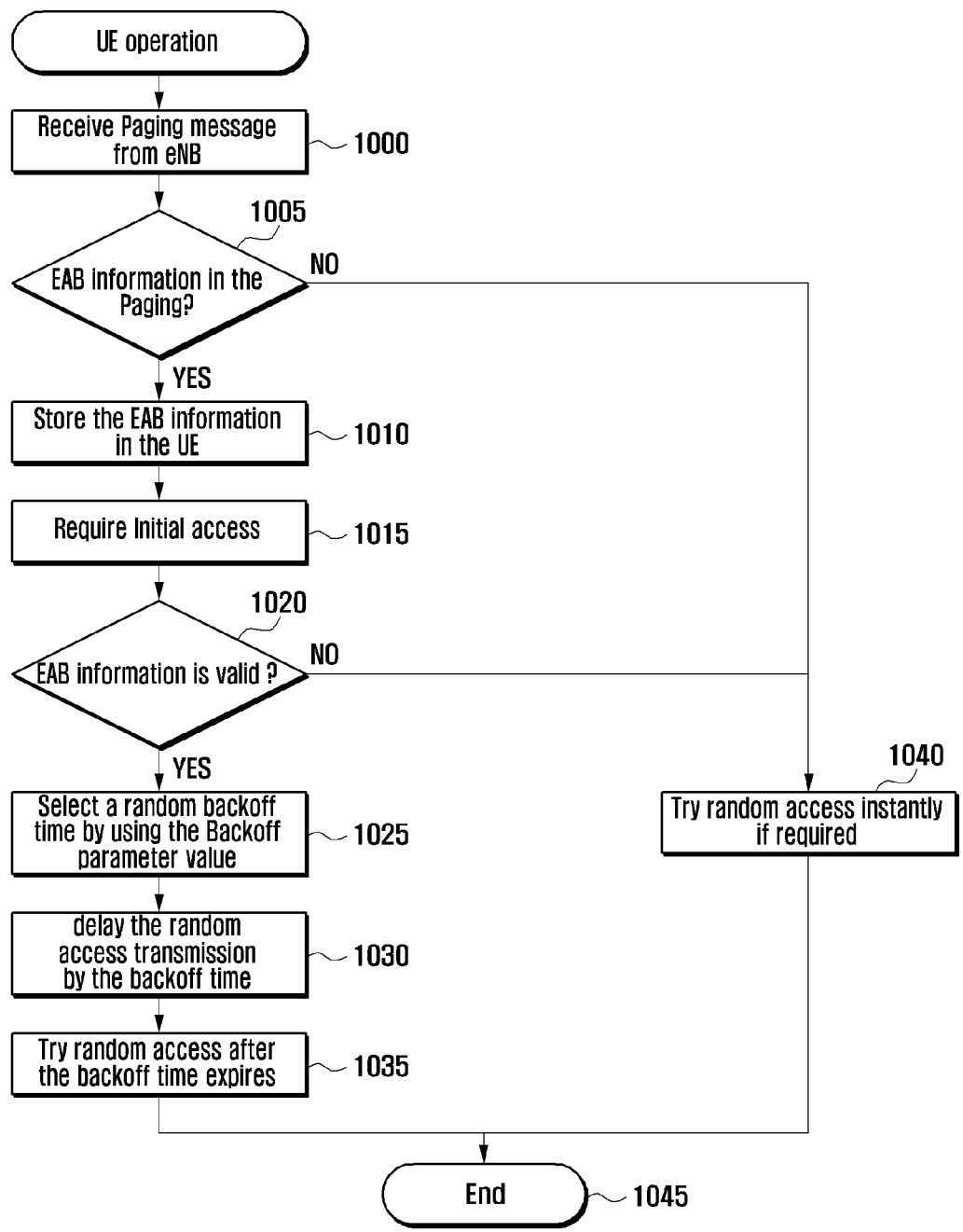
FIG. 10 is a flowchart illustrating a UE procedure of an access control method according to the fourth exemplary embodiment of the present invention.

FIG. 10 is a flowchart illustrating a UE procedure of an access control method according to the fourth exemplary embodiment of the present invention.

Referring to FIG. 10, the UE receives a paging message at step 1000. The UE then determines whether the paging message includes EAB information at step 1005. If the EAB information is not included and if an initial random access is required, the UE instantly attempts a random access at step 1040. If the EAB information is included, the UE stores the EAB information at step 1010. Valid EAB information is applied for a preset time duration. After storing the EAB information, the UE is required to attempt the initial random access to the eNB at step 1015. At this time, the UE determines whether the EAB information is valid at step 1020. The validity of the EAB information is determined based on the preset time duration. If the preset time elapses, the validity of the EAB information is nullified. The UE determines a backoff time to be applied using the backoff parameter at step 1025. The UE delays random access until the backoff time expires at step 1030. If the backoff time expires, the UE attempts random access to the eNB at step 1035. The procedure ends at step 1045.

Figure 11:
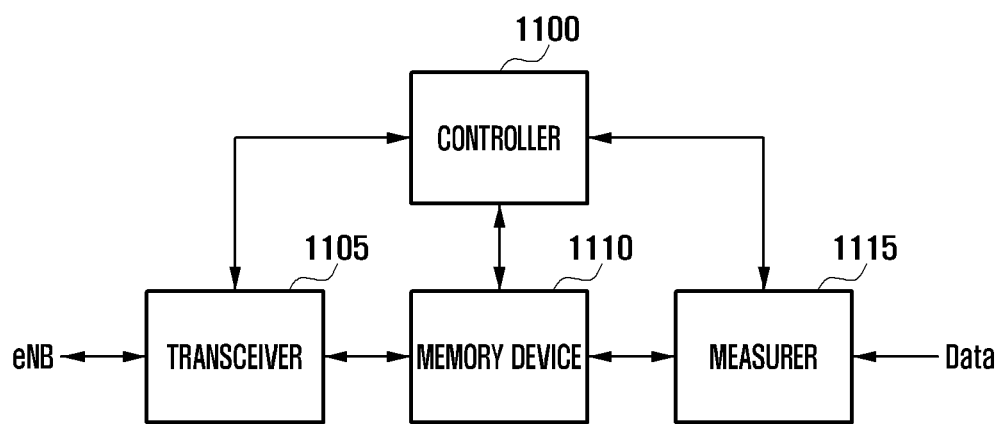
FIG. 11 is a block diagram illustrating a configuration of a UE according to an exemplary embodiment of the present invention.

FIG. 11 is a block diagram illustrating a configuration of a UE according to an exemplary embodiment of the present invention.

Referring to FIG. 11, the UE includes a controller 1100, a transceiver 1105, a memory device 1110, and a measurer 1115. The controller 1100 controls operations of the components. The controller 1100 decodes and analyzes a paging message, a SIB1, and SIBx information received by the transceiver 1105, controls the transceiver 1105 to transmit access information stored in the memory device 1110, and controls the measurer 1115 to collect data to be transmitted to an eNB and transfer the collection information to the memory device 1110. The controller 1100 also determines a backoff time using a backoff parameter received from the eNB and determines a random access attempt timing.

Although not illustrated, the eNB according to an exemplary embodiment of the present invention includes a transceiver and a controller. The transceiver transmits the paging message, the SIB1, and the SIBx information. The controller controls the transceiver to transmit the EAB information to the UE which is waiting for the initial random access attempt. At this time, the controller may determine whether to change preconfigured EAB information. If it is necessary to change the EAB information, the controller may transmit a paging message notifying the UE of the EAB information change such that the UE delays a random access attempt. Also, if it is necessary to change the EAB information, the UE may transmit a paging message including the EAB information.

The EAB information may be applied to all UEs, and the EAB information may be applied depending on a Public Land Mobile Network (PLMN) which provides service to the UE. Assuming that the EAB information is categorized into one of three categories, a first category (category a) EAB information is applied to all of the UEs, a second category (category b) EAB information is applied to all of the UEs with the exception of the UEs served by a Home PLMN (HPLMN) and an equivalent PLMN (ePLMN), and a third category (category c) EAB information is applied to all of the UEs with the exception of the UEs served by the HPLMN and ePLMN and roaming UEs. That is, the categories have the relationship of category a ⊃ category b ⊃ category c.

In order to reduce a RAN load, the eNB may restrict access of all MTC devices by barring the UEs belonging to the first category. If it is determined to exclude the UEs connected to the HPLMN and ePLMN from the access barring list, the eNB may select the category b. Furthermore, if it is determined to exclude the roaming UEs as well as the UEs connected to the HPLMN and ePLMN from the access barring list, the eNB may select the category c. By controlling the random access of the UEs per category, the access barring can be controlled based on the priorities of the UEs in view of the network operation. For category-based access control, the eNB has to notify the UE of the category of the EAB information. The EAB information category may be indicated as described below according to exemplary embodiments of the present invention.

In the first exemplary embodiment of the present invention, a new indicator for indicating the EAB category may be included in the paging method along with the EAB-indication. In this case, if the paging message is received, the UE determines whether to decode the SIB information for acquiring the EAB information based on the category to which the UE belongs. Accordingly, it is possible to prevent the UE belonging to the category, which is not a target for barring access, from unnecessarily decoding the EAB information. This is applied to the second exemplary embodiment of the present invention.

In the third and fourth exemplary embodiments of the present invention, the EAB-indication for notifying of the existence of EAB information is not transmitted to the UE. In the third exemplary embodiment of the present invention, the eNB transmits to the UE the SIB including an indicator informing of the category of the EAB included in a specific SIB. In the fourth exemplary embodiment of the present invention, the paging message includes the EAB information and corresponding indicator.

FIG. 12 is a diagram illustrating formats of an EAB category indicator for use in an access control method according to an exemplary embodiment of the present invention.

Referring to FIG. 12, reference numbers 1205, 1210, and 1215 denote the EAB category indicators informing of the respective EAB categories. The EAB category indicator is a 2-bit value that discriminates among three categories. For example, the reference number 1205 denotes the EAB category indicator for indicating category a with a value of 01. The reference number 1210 denotes the EAB category indicator for indicating category b with the value of 10. The reference number 1215 denotes the EAB category indicator for indicating category c with the value of 11.

As described above, a random access method of an exemplary embodiment of the present invention enables a terminal to receive the SIB including updated access barring information immediately without waiting for the arrival of a next modification period, resulting in access barring efficiency.

In order to achieve efficient access barring, an indicator instructs the UE to receive the SIB immediately in a paging message.

Furthermore, the access control method and apparatus of an exemplary embodiment of the present invention enable the eNB to restrict an initial random access of the MTC devices first to efficiently control the RAN load.

While the invention has been shown and described with reference to certain exemplary embodiments thereof, it will be understood by those skilled in the art that various changes in form and details may be made therein without departing from the spirit and scope of the present invention as defined by the appended claims and their equivalents.

What is claimed is:

1. A method by a base station in a communication system, the method comprising:
    transmitting a paging message to an extended access barring (EAB) capable terminal, the paging message including information indicating a change of EAB information;
    transmitting first system information including scheduling information related to second system information without waiting until a next system information modification period; and
    transmitting the second system information including changed EAB information to the EAB capable terminal based on the scheduling information related to the second system information.

2. The method of claim 1, wherein previously received system information in the EAB capable terminal is discarded, if the scheduling information related to the second system information is not included in the first system information.

3. The method of claim 1, wherein the second system information includes first information indicating at least one access class among a plurality of access classes.

4. The method of claim 1, wherein the second system information includes second information indicating a category of terminals for which the changed EAB information is applied.

5. The method of 4, wherein the category corresponds to one of a first category indicating all terminals, a second category indicating terminals with the exception of terminals served by a home public land mobile network (HPLMN) and an equivalent PLMN, and a third category indicating terminals with exception of the terminals served by the HPLMN and the equivalent PLMN, and terminals related to roaming.

6. The method of claim 1, wherein the changed EAB information is not applied to the EAB capable terminal, if at least one of an access class information and category information in the second system information does not corresponds to the EAB capable terminal.

7. A base station in a communication system, the base station comprising:
    a transceiver; and
    a controller configured to control the transceiver to:
        transmit a paging message to an extended access barring (EAB) capable terminal, the paging message including information indicating a change of EAB information,
        transmit first system information including scheduling information related to second system information without waiting until a next system information modification period, and
        transmit the second system information including changed EAB information to the EAB capable terminal based on the scheduling information related to the second system information.

8. The base station of claim 7, wherein previously received system information in the EAB capable terminal is discarded, if the scheduling information related to the second system information is not included in the first system information.

9. The base station of claim 7, wherein the second system information includes first information indicating at least one access class among a plurality of access classes.

10. The base station of claim 7, wherein the second system information includes second information indicating a category of terminals for which the changed EAB information is applied.

11. The base station of claim 10, wherein the category corresponds to one of a first category indicating all terminals, a second category indicating terminals with the exception of terminals served by a home public land mobile network (HPLMN) and an equivalent PLMN, and a third category indicating terminals with exception of the terminals served by the HPLMN and the equivalent PLMN, and terminals related to roaming.

12. The base station of claim 7, wherein the changed EAB information is not applied to the EAB capable terminal, if at least one of an access class information and category information in the second system information does not corresponds to the EAB capable terminal.

* * * * *